United States Patent [19]

Wright et al.

[11] 3,844,573

[45] Oct. 29, 1974

[54] SPLICE CASE WITH GAS TIGHT SEAL

[75] Inventors: James A. Wright; James M. Kosmala, both of Cattaraugus, N.Y.

[73] Assignee: The Dexter Corporation, Olean, N.Y.

[22] Filed: June 4, 1973

[21] Appl. No.: 366,443

Related U.S. Application Data

[62] Division of Ser. No. 260,224, June 6, 1972, Pat. No. 3,796,823.

[52] U.S. Cl. .............................................. 277/216
[51] Int. Cl. ..................... F16j 15/10, H02g 15/08
[58] Field of Search ........................... 277/216–222, 277/209, 211, 215, 227, 237; 174/91–93, 77 R, 88 R, 152 G, 153 G, 65 G

[56] References Cited
UNITED STATES PATENTS

| | | | |
|---|---|---|---|
| 963,645 | 7/1910 | Pendleton | 277/216 |
| 2,459,370 | 1/1949 | Ferguson et al. | 277/216 |
| 2,517,693 | 8/1950 | Mead et al. | 277/192 |
| 2,517,717 | 8/1950 | Rose | 277/192 |
| 2,537,232 | 1/1951 | Nottingham | 277/216 |
| 3,013,825 | 12/1961 | Wilson | 277/216 |

Primary Examiner—Louis R. Prince
Assistant Examiner—Robert I. Smith
Attorney, Agent, or Firm—Harris, Kern, Wallen & Tinsley

[57] ABSTRACT

A gas tight seal for a communication cable splice case to withstand high and low temperature cycling and suitable for installation in the field. A split case with a resilient grommet at each end in compressive engagement with the case and cable, with the grommet oversize in the dimension perpendicular to the case flanges and having interior cavities for internal deformation of the grommet when compressed by the closing of the case urging the grommet into sealing engagement with the case and with the cable.

10 Claims, 7 Drawing Figures

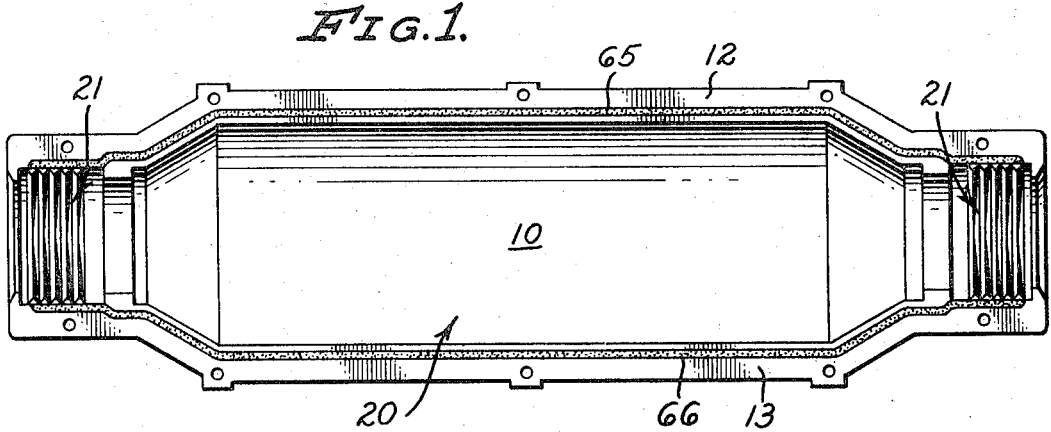
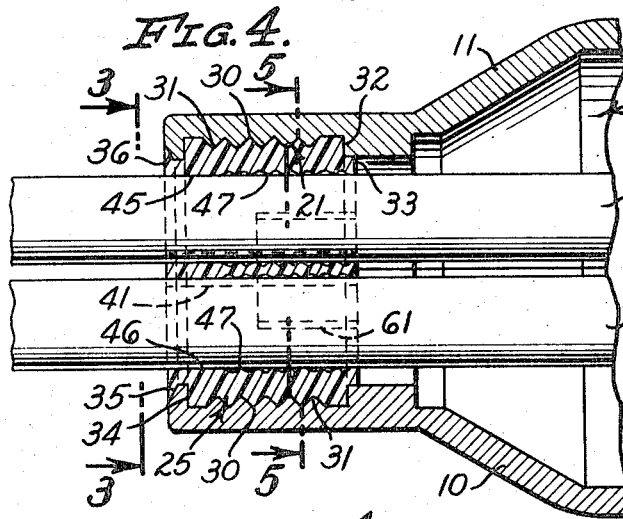
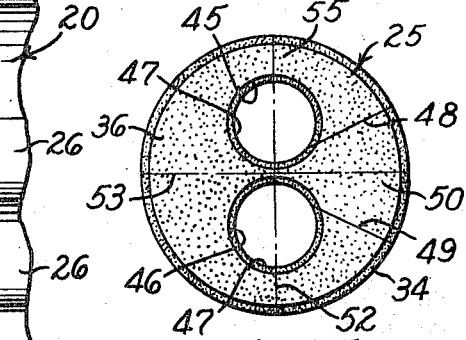
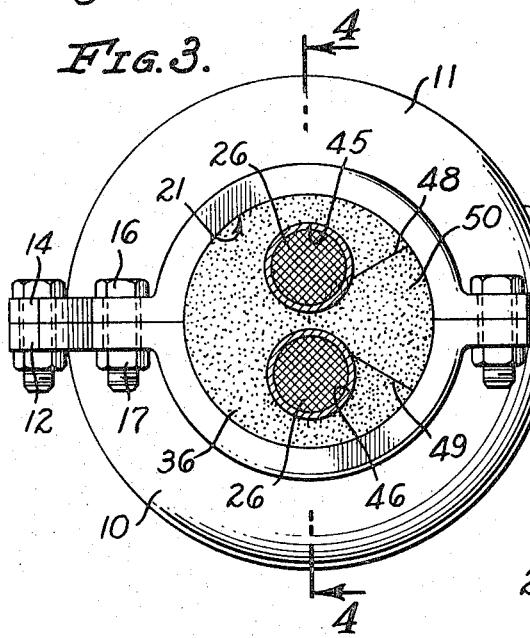
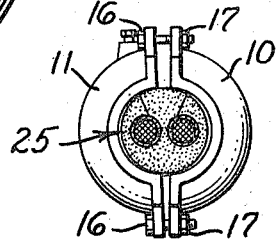
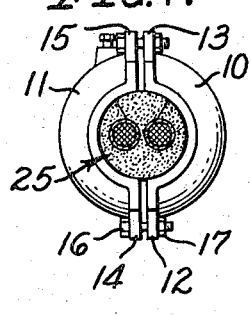

SPLICE CASE WITH GAS TIGHT SEAL

This is a division of application Ser. No. 260,224, filed June 6, 1972 and now U.S. Pat. No. 3,796,823.

BACKGROUND OF THE INVENTION

This invention relates to the splicing of multiconductor communication cables, typically telephone cables, and more particularly to an assembly for providing a gas tight seal for the splice casing.

A typical communication cable may contain a large number of small conductors with appropriate electrical insulation and an outer metal sheath and be in the order of 1 inch diameter. Two or more cables are spliced by exposing individual conductors thereof and making electrical connections therebetween. After the splicing is completed, the splice zone is enclosed in a case for protection and a typical splice case is shown in U.S. Pat. No. 3,614,298. Splice cases of this type have been in use for a long time and comprise mating half tubular sections which are bolted together at flanges providing an open interior for the spliced cables and providing access openings at each end for the cables. Some form of seal is provided about the cables at each access opening and the interior of the case is charged with a gas at about 10 psi to prevent entry of moisture into the case. Therefore the seals should be gas tight and should maintain the sealing integrity over the wide temperature fluctuations encountered in the field, typically from −40° to +140° Fahrenheit and through the variety of mechanical stress introduced by cable flexing and the like.

Two approaches have been utilized in sealing the splice cases. In one arrangement, lead sheaths are sweated or forged on the cables, lead rings are positioned between the cables and the case, and after the case is bolted together, the assembly is caulked with molten lead.

In another approach, the cables are wrapped with a tape or cord to fill the space between the cable and case and this structure is soaked with an adhesive to bond the elements together. Several variations of this approach are shown in the aforementioned U.S. Pat. No. 3,614,298 and U.S. Pat. Nos. 3,148,241, 2,771,502 and 3,061,666.

While some of these prior configurations have met the requirement of a gas tight seal, they are difficult to produce, particularly in the field, and require considerable time and expertise to obtain the desired gas tight condition over the operating extremes.

It is often required that a splice case be opened, the conductor connections be changed, and the case be resealed in the field. The prior art seals have been particularly troublesome to the field worker because of the problems of removing the remnants of the old seal from the cable and the case halves prior to preparing the new seal. Furthermore, forging lead sheaths and handling molten lead is a difficult operation in the field, in addition to the fact that the metal-to-metal joint between the lead sealing material and the iron or aluminum case is subject to great stress during temperature changes. Similarly, the cleaning out of the adhesive loaded wrapped tape or mastic packed seal and the installation of a fresh seal is expensive and sometimes uncertain under field conditions.

Accordingly, it is an object of the present invention to provide a new and improved splicing assembly for a communication cable using the conventional split case and a seal for each access opening in the form of a single unitary factory produced elastomeric grommet with the cable positioned therein and with the gas tight sealing being accomplished by the clamping action of the case halves compressing the uniquely configured grommet into sealing engagement with the case and cable. Such a seal will not require lead sweating or casting or adhesive soaked tape or mastic.

SUMMARY OF THE INVENTION

The splicing assembly of the invention includes a conventional split case with two half tubular sections joined at flanges and providing circular access openings at each end, and incorporating means for introducing gas under pressure into the interior of the case. A unitary elastomeric grommet is positioned in each of the access openings, with the periphery of the grommet in engagement with the case and with the configuration of the periphery of the grommet generally dictated by the configuration of the case opening. One or more passages are provided through the grommet for the cable. Preferably each passage has a plurality of ridges of inside diameter less than the outside diameter of the cable to provide a gripping engagement with the cable. The cable is inserted into the passage through a slit in a thick wall section of the grommet, and cavities are provided in the inner face of the grommet on opposite sides of the cable passage. The grommet has a dimension perpendicular to the plane of the flanges of the case sections greater than the diameter of the case access opening. In use, the cables are positioned in the grommets and the cable and grommet assembly is positioned in a case half section. The other case half section is placed in position and the case sections are bolted together. The clamping action of the case compresses the grommet about the cable, compresses the grommet along the dimension perpendicular to the plane of the flanges providing tight engagement between the grommet and case, and provides compression forces at the slit faces, with the cavities providing for internal deformation of the resilient grommet. A flexible sealing compound may be provided at the case-grommet and grommet-cable interfaces and at the slit faces. The resultant assembly meets the requirements for a gas tight seal and successfully passes the temperature cycling tests specified by the telephone companies.

BRIEF DESCRIPTION OF THE DRAWING

FIG. 1 is an interior view of a conventional splice case half section;

FIG. 2 is an end view of a grommet for a splicing assembly, incorporating the presently preferred embodiment of the invention;

FIG. 3 is an end view of a splicing assembly showing the case, grommet and cables in position;

FIG. 4 is a sectional view taken along the line 4—4 of FIG. 3;

FIG. 5 is a sectional view taken along the line 5—5 of FIG. 4; and

FIGS. 6 and 7 are views similar to FIG. 3 illustrating steps in the assembly of the case.

DESCRIPTION OF THE PREFERRED EMBODIMENTS

The splice case is formed of split sections 10, 11 joined along flanges 12, 13, 14, 15 by bolts 16, and nuts 17 to provide a large central splice zone 20 and reduced ends with access openings 21.

A grommet 25 is provided for each access opening, with one or more cables 26 passing through each grommet. A cable splice may require one cable from each end of the case or two cables at one end and one cable at the other end or two cables at each end, depending on the telephone company's requirements. Grommets with a single cable opening and grommets with two or more cable openings can be utilized as required.

The grommet 25 is a single unitary elastomeric unit typically molded of urethane or other suitable plastic which will maintain its elastomeric qualities over the desired temperature operating range. The periphery of the grommet may have a configuration which corresponds with the configuration of the access opening of the case, typically comprising arcuate ridges 30 and grooves 31 with a shoulder 32 adjacent the inner face 33 and a shoulder 34 and flange 35 adjacent the outer face 36. The ridges 30 and grooves 31 are not circumferential, being interrupted by longitudinal ridges 40, 41 diametrically opposite each other on the periphery of the grommet. In the subsequent discussion, the ridge 40 is arbitrarily referred to as the top of the grommet and the ridge 41 the bottom.

The ridges 40, 41 engage corresponding grooves in the case sections and provide for rotational alignment of the grommet in the case. The ridges 30 and grooves 31 and the shoulders 32, 34 engage corresponding elements in the case and lock the grommet in place against axial movement in the case. Alternatively the periphery of the grommet may be smooth and engage the case only at the case opening ridges.

Cable passages 45, 46 are provided through the grommet 25. Each cable passage desirably is slightly smaller than the cable to be positioned therein and in the embodiment disclosed, each passage contains a plurality of circumferential ridges disposed along the passage for engagement with the cable, with the ridges being deformed slightly when clamped into engagement with the cable as will be described below.

Slits 48, 49 through a thick wall section 50 of the grommet provide access for sliding the cables into the passages 45, 46, respectively. The slit is a potential gas leakage path and the slit location is selected to provide optimum slit closing forces when the grommet is clamped in position in the case. The dimension of the grommet perpendicular to the plane of the case flanges is made greater than the diamter of the case access opening by a few percent, typically about 2 percent. Preferably the grommet is elliptical in cross section with a major axis 52 and a minor axis 53, with the major axis perpendicular to the plane of the case flanges and with the cable passages 45, 46 on opposite sides of the minor axis 53. Alternatively, the grommet can be circular in cross section with the grommet diameter greater than the opening diameter by a few percent. When the case halves are clamped together, the grommet is compressed across the major axis and compression forces are produced at the faces of the slits 48, 49.

The specific location of the slits 48, 49 may vary and the specific orientation of the slits may vary, but the slits should be in the thick wall section as at 50, rather than in a thin wall section as at 55. The preferable angular location for the slits is that shown in FIG. 2, where the plane of the slits is oblique to the plane of the minor axis 53 and at an angle such that the compression forces at the slit faces resulting from compression of the grommet along the major axis, are substantially perpendicular to the slit faces, which configuration provides the optimum sealing and minimum opportunity for gas leakage.

It is preferred that the minor axis 53 be smaller than the diameter of the case access opening by a few percent, typically about two percent. With this relationship, the grommet is more easily placed in position in a case half. As the case halves are clamped together compressing the grommet along the major axis, it can expand along the minor axis to provide complete sealing engagement on the periphery of the grommet.

Cavities 60, 61 are provided in the thick wall sections of the grommet on opposite sides of the cable passages 45, 46. The thick wall sections are generally T-shaped and the cavities preferably have the same configuration, as shown in FIG. 5. The cavities are formed in the inner face 33 and extend toward the outer face, typically at least half way from the inner face toward the outer face. In the single cable configuration, the cable passage may be centrally located in the grommet with the slit along the minor axis and with a pair of arcuate cavities on opposite sides of the cable passage. In operation, the cavities permit internal deformation of the grommet when it is compressed by clamping in the case. Without this internal deformation capability, buckling is likely to occur along the periphery of the grommet creating potential gas leakage paths between the grommet and case.

In assembling the splice case after the splicing has been completed, strips 65, 66 of conventional sealing tape are positioned in the grooves of the conventional case section 10. A grommet is selected for each end and the cables are inserted into the grommet through the slits. The grommet and cable assembly is then placed in the case section 10 with a grommet at each end of the case section and engaging the mating ridges and grooves. The other case section 11 is laid down on the first case section and the bolts are inserted and tightened along the lower flanges, as seen in FIG. 6. Bolts are inserted and tightened along the upper flanges, bringing the case to the condition of FIG. 7. The lower bolts are again tightened to the condition of FIG. 3 and the upper bolts are then tightened. A thin layer of a flexible sealing compound can be applied along the case-grommet interfaces and the cable-grommet interfaces and the grommet slit faces to improve the gas sealing capability. Various sealing compounds on the market can be used. Urethane base compounds which operate over the temperature range of −40° to +140°F. are preferred.

When the case is clamped on the grommets, the grommets are compressed along the major axis and expand along the minor axis bringing the periphery of the grommet into tight sealing engagement with the case sections. The grommet is also compressed about the cable in each of the cable passages, bringing the ridges into engagement with the cable and deforming the ridges somewhat to provide a tight seal between grommet and cable. The grommet compression also produces compression forces at the slit faces producing a gas tight seal along the slits. The cavities permit internal deformation of the grommet resulting from the compression forces without producing buckling at any of the interfaces.

The case tightening procedure wherein the bottom flanges are tightened ahead of the top flanges insures proper closing of the slit and prevents mismating of the slit faces during the clamping operation.

The splicing assembly of the present invention provides a useable gas tight seal for the communication cable field. By way of example, a splicing assembly with a conventional cast iron split case having three and ½ inch diameter access openings and two one and ¼ inch lead sheathed cables exiting at each end and a molded urethane grommet installed with a flexible sealing compound has successfully passed temperature cycling tests. The case was charged with nitrogen at plug 68 to 10 psi and the assembly was cycled from −40° F. to 140° F. and back every eight hours for 100 cycles without gas leakage.

The unitary grommet is easily and quickly installed in the field and provides a substantially fool-proof arrangement for making a gas tight seal in a splicing assembly. The factory produced grommet seal is particularly advantageous where a sealed case is to be opened for a change in electrical connections and then resealed. The original grommets are readily removed, the case does not require any extensive cleaning operations, and the case is readily sealed again after the electrical connections have been revised.

We claim:

1. A grommet for positioning in the access openings of a split case for a multiconductor sheathed communication cable splice, said grommet comprising a generally cylindrical unitary elastomeric body having an inner face and an outer face and at least one cable passage therethrough, a slit through a thick wall section between the cable passage and the periphery, a dimension perpendicular to the parting plane of the split case greater than the access opening diameter, and cavities in said inner face on opposite sides of said cable passage and extending part way toward said outer face, so that the split case when joined clamps said grommet in the access opening compressing the grommet clamping the grommet on the cable sheath and producing compression forces at the face of the slit for maintaining a gas tight seal between case and cable.

2. A grommet as defined in claim 1 wherein said cavities are centrally positioned in and have the configuration of the thick wall section of the grommet.

3. A grommet as defined in claim 1 including a pair of parallel cable passages spaced from each other along said major axis defining generally T-shaped thick wall sections on opposite sides of said major axis, with said cavities generally T-shaped and in said T-shaped wall sections.

4. A grommet as defined in claim 3 wherein said cavities extend at least half way from said inner face toward said outer face.

5. A grommet as defined in claim 1 wherein said major axis of the grommet exceeds the minor axis thereof by a few percent.

6. A grommet as defined in claim 1 wherein the slits are in arms of the T-shaped wall sections.

7. A grommet as defined in claim 1 wherein each of the slits is adjacent a cavity.

8. A grommet as defined in claim 1 wherein each of the slits is in a plane oblique to the parting plane at an angle such that the compression forces at the slit face are substantially perpendicular to the face.

9. A grommet as defined in claim 1 having elements interengageable with the elements of the case for axially locking the grommet in the case.

10. A grommet as defined in claim 1 having a generally elliptical cross section with a major axis perpendicular to the parting plane of the split case and greater than the access opening diameter.

* * * * *